United States Patent
Schiffmiller et al.

(10) Patent No.: US 6,933,888 B1
(45) Date of Patent: *Aug. 23, 2005

(54) MULTI-SHIP COHERENT GEOLOCATION SYSTEM

(75) Inventors: Richard Schiffmiller, Teaneck, NJ (US); Henry Adler, New York, NY (US); Melvin Carroll, Flushing, NY (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/867,056

(22) Filed: Jun. 14, 2004

(51) Int. Cl.[7] ................................................ G01S 1/24
(52) U.S. Cl. ..................................... 342/387; 342/442
(58) Field of Search ............................... 342/387, 442, 342/443, 444, 457, 463

(56) References Cited

U.S. PATENT DOCUMENTS

| | | | | |
|---|---|---|---|---|
| 5,119,104 A | * | 6/1992 | Heller | ......................... 342/450 |
| 5,191,342 A | * | 3/1993 | Alsup et al. | ................. 342/465 |
| 5,708,443 A | * | 1/1998 | Rose | ............................ 342/442 |
| 2004/0002347 A1 | * | 1/2004 | Hoctor et al. | ............. 455/456.1 |
| 2004/0203870 A1 | * | 10/2004 | Aljadeff et al. | ........... 455/456.1 |

* cited by examiner

Primary Examiner—Dao Phan
(74) Attorney, Agent, or Firm—Robert K Tendler; Daniel J. Long (57) ABSTRACT

A system is provided for rapidly ascertaining the position of a pulse train emitter such as a radar using multiple collectors without requiring more than one platform to measure the same pulse. Thus time-of-arrival measurements at a number of collecting platforms are performed, with the positions of the platforms being accurately ascertainable using GPS data, and with time synchronization between the spaced-apart collectors performed by utilizing atomic clocks. In the multi-ship case, geolocation can be performed on ten milliseconds of data as opposed to 30 seconds of data for measurements involving a single platform. The subject system is preferable to conventional time-difference-of-arrival geolocation systems because those systems require that each of the collecting platforms measure the same pulse from the emitter, which severely constrains the flight paths of the collectors, limits the amount of usable data, and increases the system's sensitivity requirements.

23 Claims, 7 Drawing Sheets

$$TOA_i = T_0 + \frac{\Delta R_i}{C} + \underbrace{(n_i - 1) PRI}_{\equiv (N_i - 1) Q}$$

*Fig. 6*

$\Delta R_1, \Delta R_2, \Delta R_3 \Rightarrow x_e, y_e, z_e$

MULTI-SHIP COHERENT GEOLOCATION SYSTEM

FIELD OF THE INVENTION

This invention relates to geolocation and more particularly to a system for rapidly determining the location of a pulsed waveform emitter such as a radar using two or more collection platforms.

BACKGROUND OF THE INVENTION

As described in a pending U.S. patent application entitled COHERENT GEOLOCATION SYSTEM by Richard Schiffmiller, Henry Adler and Melvin Carroll filed on even date herewith, assigned to the assignee hereof and incorporated herein by reference, a coherent time-of-arrival (TOA) geolocation system is described. In one embodiment a collector aboard an aircraft or other vehicle is moved from one location to the next to collect data on which a TOA geolocation of a pulsed emitter such as a radar is made. However, to establish a long enough baseline for adequate location accuracy, it takes a considerable amount of time to fly the required baseline distance, sometimes 30–90 seconds. It would thus be desirable to be able to cut down the processing time for achieving geolocation.

By way of background, it is tactically important for a military aircraft that is overflying an enemy territory and detecting pulsed radiation from a radar to be able to locate the position of the radar so that the radar can either be destroyed, avoided or countermeasured. Two classes of time-based methods have been used in the past to geolocate a radar. The first utilizes time difference of arrival (TDOA) of radar pulses, measured either across two antennas of a single aircraft, or across multiple aircraft. The second measures the time of arrival (TOA) of a radar's pulses at a single platform in a non-coherent fashion by averaging data taken from a number of snippets called dwells. This system exploits the varying inter-pulse intervals due to movement of the platform from one position to another.

In both of the above cases the accuracy of the geolocation depends on the baseline between the collectors used to detect the emitted pulses or the distance the single collector moves during the geolocation measurement period. Note that the longer the baseline, the better will be the location accuracy. Prior multi-ship Time Difference Of Arrival systems, while useful, require that the same pulses be detected by more than one collector and that the collectors know which pulses on one platform correspond to which on the others. The latter requirement, if not met, can lead to ambiguous geolocations of the radar. The former requirement is even more severe. If the collectors do not detect the same pulses, the position of the emitting device cannot be accurately ascertained by the here-to-fore used methods.

Measuring the same pulses on multiple platforms is difficult to achieve. There may be physical obstructions that block a platform's line of sight to a radar so that pulses detected by one aircraft may not be detected by the others. Also, the collectors' receivers may not be tuned to the same frequency bands at the same time, and so will not detect the same pulses from the emitter. Finally, the collectors may not have the sensitivity to detect a scanning radar beam in its side lobes or back lobes, and the main beam of the radar may be illuminating only one collector at a time. As to TOA systems, prior time-of arrival systems that use non-coherent processing operate on snippets or dwells of data, with many snippets of data collected over many tens of seconds of flight in an attempt to establish a long baseline. This prior method measures the times of arrival associated with each snippet independent of the others and then averages the time-of-arrival results. This approach is called "non-coherent" processing as it does not exploit any possible long time uniformity or coherency across the snippets of data. Pulse data is coherent over a period only if there is some constancy in the radar emission process over that period, e.g., the pulse repetition interval (PRI) does not change.

As to PRI, typically the emitter's PRI is often purposely varied depending on the mode of operation or is inherently unstable over time. Thus, the reason for using short snippets of data in the past was to assure that the radar's PRI did not change over the measurement or that there are no gaps in receipt of the pulses, thereby assuring coherency at least over the snippet.

Note that when only a small snippet of data is considered the baseline associated with the data is exceedingly short. This means that any geolocation using the snippet alone will be unacceptably error-prone. Averaging the times of arrival in a dwell and using those average values to extend the baseline (non-coherent processing) typically requires more than 60 seconds of data to converge and does not produce geolocation results that are nearly as accurate as coherent processing.

To summarize, processing TOA data non-coherently involves averaging the time-of arrival results over each short snippet of data and finding a location for those values. Any coherent processing that is done occurs only over the short snippets involving short collection periods or dwells. Because of this, the resultant geolocation has limited accuracy despite averaging.

SUMMARY OF THE INVENTION

There is, however, a method for speeding up data collection and markedly increasing accuracy by adapting coherent single-ship TOA techniques to a multi-ship environment. The subject technique permits taking data simultaneously at multiple spaced-apart locations both to increase the baseline and to dramatically decrease data collection times from tens of seconds to ten or twenty milliseconds. This is because one does not have to wait for a single ship to fly from one location to another to establish a long baseline. The subject technique is also a dramatic advance over current TDOA techniques in that it does not require that the collectors measure the same pulses and still achieves the same geolocation accuracies as the TDOA multi-ship geolocation methods that do require the measurement of the same pulses on all platforms. The problems that the subject technique addresses are the length of time it takes for a collector to move from one position to another and that the collectors at two different positions are not receiving the same pulse from the emitter.

The accuracy of the geolocation one can obtain when using multiple collectors depends on the geometry, with the geometry being defined as where the radar emitter is with respect to the collectors and the relative separation of the collectors; the time of arrival measurement accuracy; and the accuracy of the measurement of the position of the collecting antenna on each of the platforms. In general, the geolocation accuracy is better the farther apart the collectors are from each other and the closer the collectors are to the emitting radar.

Rather than depending on detecting the same pulse at a number of different collectors, in one aspect of the subject invention there are multiple ships, platforms or collectors involved which do not have to measure the same pulses. Note, the multi-ship algorithm for use with multiple collectors permits ascertaining the position of the emitting radar within milliseconds as opposed to tens of seconds and with geolocation errors measured in tens of meters or less.

A feature of this invention is the concept that coherently determining geolocation can be extended to multiple collecting platforms. As a result, a precise answer can be achieved with only a single dwell of data (i.e., 10–20 milliseconds) collected at multiple platforms. This technique yields geolocation errors of tens of meters or less with milliseconds of data.

It will be appreciated that in order to relate the time-of-arrival measurement of a pulse to the location of the radar, one must know the time that pulse was emitted from the radar, the location of the collector when it received the pulse, and the precise time of transit (which may be converted to a distance by multiplying by the speed of light) of the pulse from the radar to the collector. It will be shown that it is not necessary to measure the time-of-arrival of any one pulse at more than one of the spatially separated collectors. The pulse data collected at each platform is combined and treated as if a single detector measured all the data, but at different positions. The location of the collector measuring each pulse is known, so one may consider the situation as if a single collector was moving to the actual positions of each collector to receive each pulse that is measured. This requires that the timing circuits in the pulse collection systems on each platform are synchronized to one another by the GPS one pulse-per-second strobe or some other standard, so that they can be considered as if they are all operating with the same clock.

For example, if there are three collecting platforms that are spaced twenty miles apart from each other, and each receives a pulse 10 milliseconds apart from the other, then upon combining the data with the location of the collector that received it, one can conceptually think of the situation as if one ship measured the first pulse, moved 20 miles in 10 milliseconds and collected the second pulse, and then moved 20 miles again and measured the third pulse. This "virtual" motion achieves an exceptionally long baseleg in a short amount of time and can achieve in milliseconds the performance of a single platform flying for many minutes.

For this "virtual" motion concept to work, it is necessary to know what pulse each platform is detecting in the sequence emitted by the radar. In one embodiment, knowing the pulse number, one can utilize different pulses in the transmission sequence to geolocate the emitter (i.e., the same pulse does not have to be detected by more than one collector). The arriving pulse is assigned a number N, an integer, reflecting the position of the pulse in the emitted pulse train.

It can be shown that one can ascertain when the first pulse was transmitted and the underlying pulse repetition interval. In so doing, one need not provide detection of the same pulse at all collectors, but need only correlate each received pulse with its corresponding transmitted pulse from the radar.

When geolocating with a single moving collector, the amount of time necessary to obtain the location of the emitter is typically several tens of seconds. Moreover, with a single moving collector the accuracy of the emitter location measurement is much less than when one geolocates with several spaced-apart collectors. For instance, one usually describes the accuracy of a single-ship geolocation measurement in terms of a percentage of the range, with a 5% of range accuracy being quite good. This means that at a range of 20 miles from the emitter, the accuracy is plus or minus one mile.

However, it will be seen that when utilizing multiple collectors, the geolocation accuracy error can be reduced to a few tens of meters or less. This is accomplished when the collectors are spaced miles apart, creating a significant baseline. Alternatively, the collectors can be closer to each other, but surrounding the emitter, and the precision of the geolocation will be on the order of meters. Each of the collectors must accurately determine its location when it receives each pulse and can do so by using a GPS receiver. Further, the geolocation system must provide very accurate synchronization between each of the collectors. This is accomplished in one embodiment through the utilization of a local atomic clock on each platform that is locked to the GPS one pulse-per-second output such that each of the collectors can be thought of as having the same clock. Thus a collector can measure the time of arrival of a pulse from the emitter on the same timeline as the other collectors.

As a result, for the multi-ship case, all of the collectors are measuring time in exactly the same way. In short, one can consider that each of the collectors has the same clock or at least knows what the relative offset is, which can then be accommodated.

Thus, the different collectors can be thought of as one collector moving extremely fast from one platform location to another and measuring the times of arrival of the emitted pulses.

The TOA Process

It will be appreciated that if one can ascertain the time that a pulse was in fact emitted from the emitter, and in fact if one measures the time of arrival of that pulse at the collector, then one can ascertain the time of transit of that pulse. Then, after converting the time of transit to a distance by multiplying by the speed of light and knowing the position of the collector when the pulse arrived, one may deduce the straight line radial distance to the emitter. By taking multiple time-of-arrival readings for different collector positions to create a "baseleg," one can determine the exact location of the emitter. The length of the baseleg depends on the geometry and the size of the measurement errors of time and collector position. For the subject invention, the number of platforms, their relative positions with respect to the emitter, and the measurement accuracies will determine the degree of accuracy of the geolocation result.

For multiple pulses, one must know which received pulses at the collectors correspond to which transmitted pulses at the radar. Processing the aggregate of data in this way is known as coherent processing. Coherent processing includes techniques to be able to specify the underlying constant repetition interval (Q) of the emitter. The existence of such a parameter Q implies that the data is time coherent. A constant pulse repetition interval (PRI) also implies coherence. The coherency is maintained in the processor by associating an integer N with Q for each pulse being processed.

Thus, for coherent processing, one must be able to know the Q value of the emitter and use it to know what pulse in a train is being received. With knowledge of the emitter's Q value and the number of the pulse, N, received, one can perform geolocation without requiring the same pulses to be collected by more than one platform.

For a constant PRI, if the PRI is known, one can determine the number of any pulse in the sequence from a first pulse starting point ($T_0$) by differencing the time-of-arrival of the pulse of interest and $T_0$ and dividing by the PRI. For a non-constant PRI, one must compute the integer, N, for each pulse associated with Q. By collecting a number of times of arrival of pulses and comparing them to hypothetical times of arrival generated by considering hypothetical emitter locations and knowing the sequence integer, N, for each pulse, one can determine the location of the emitter. The subject invention finds Q, the integer, N, for each pulse, the time of transmit of each pulse from the emitter, and the geolocation of the emitter.

In one embodiment, the system begins by hypothesizing a trial position for the emitter and a time that the first pulse in the set was emitted. From that and the known positions of the collectors when they received each pulse in the set, the algorithm used in the subject invention generates expected times of arrival of pulses from the emitter at each of the collectors, for each known position of the collectors. If the measured times of arrival are sufficiently close to the expected times of arrival, then the position of the emitter is that which was hypothesized.

In practice, one is provided with a rough indication of the location of the emitter through coarse angle-of-arrival and range measurements. With a rough guess as to emitter position, one postulates a grid in the form of a swath and then hypothesizes a starting location within the grid.

At the outset, the subject geolocation algorithm establishes a first launching point in the grid, calculates the expected times of arrival of pulses at the various known collector locations and then compares the actual measured times of arrival with those that are expected. If the error between the two is not less than a threshold value, the hypothesized position is driven by a gradient descent method (Newton-Raphson) to a potentially more accurate location for the emitter. If, at any point during a fixed number of iterations of the gradient descent algorithm, the error drops below a predetermined threshold, the hypothesized location of the emitter is the declared location of the emitter. If after the fixed number of iterations, the error is not below the threshold, then a new grid box position is used to launch the algorithm and the process is repeated.

Ambiguities

Once a location is found that produces TOA errors less than the threshold value, that location is stored and a new grid box position is used to re-launch the algorithm and the process is repeated. Every valid location derived from the grid launch points represents an ambiguous location of the emitter. Ambiguities occur because of the large spacing of the collectors, and can occur even when there are no measurement errors at all.

In one embodiment, ambiguities are effectively eliminated by exploiting the velocity of the collectors, even though they hardly move at all during the 10 or 20 milliseconds of the data collect. The frequency of the pulses is Doppler-shifted due to the radial-component of the velocity vector of the collector with respect to the emitter. If the radial component of the aircraft's velocity vector is towards the emitter, the measured frequency is higher than it is at the radar; and if it is away from the emitter, the measured frequency is lower. Each ambiguous location is used to compute the Doppler shift for each measured pulse for each collector. The shift is then removed from each measured frequency. For the correct geolocation solution, all the pulse frequencies should then result in the same value, namely the frequency of transmission at the radar. The incorrect solutions will have a potpourri of resultant frequency values for the pulses and are ignored.

It can be shown that for a multi-ship collector system in which the measured pulse data of each of the multiple-ship collectors is combined with the collector location and treated as if one ship performed all the collections, then the subject system can ascertain the emitter location within meters as opposed to miles. It can further be shown that one only needs short bursts of pulses, for instance ten milliseconds, in order to accomplish the above measurement. While establishing an accurate time base for the flying platforms as well as establishing the precise location of the platforms at any given time is a non-trivial matter, it is possible with atomic clocks and GPS coordinates to ascertain the exact positions of the collectors and to be able to have the collectors function as if they were all functioning from the same clock.

In one embodiment, during the data collection phase, every received pulse is tagged with a time of arrival. Note that one does not have to have the same sensitivity for the receivers in the subject invention as in conventional time-difference-of-arrival systems because the collectors do not have to detect the same pulses. If a main lobe of the radar beam is pointing at one platform and the sidelobe of the radar beam (much weaker in power than the main lobe) is pointing at a second platform at one instant, then the conventional system would require a higher degree of sensitivity so that the platform can see the pulse in the sidelobe that the other platform measures in the main lobe. Because this is not necessary in the subject invention, the subject invention allows about 5 dB less sensitivity for the receiver systems on the platforms than the conventional TDOA system.

In summary, a system is provided for rapidly ascertaining the position of a pulse train emitter such as a radar using multiple collectors without requiring more than one platform to measure the same pulse. Thus time-of-arrival measurements at a number of collecting platforms are performed, with the positions of the platforms being accurately ascertainable using GPS data, and with time synchronization between the spaced-apart collectors performed by utilizing atomic clocks. In the multi-ship case, geolocation can be performed on ten milliseconds of data as opposed to 30 seconds of data for measurements involving a single platform. The subject system is preferable to conventional time-difference-of-arrival geolocation systems because those systems require that each of the collecting platforms measure the same pulse from the emitter, which severely constrains the flight paths of the collectors, limits the amount of usable data, and increases the system's sensitivity requirements.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
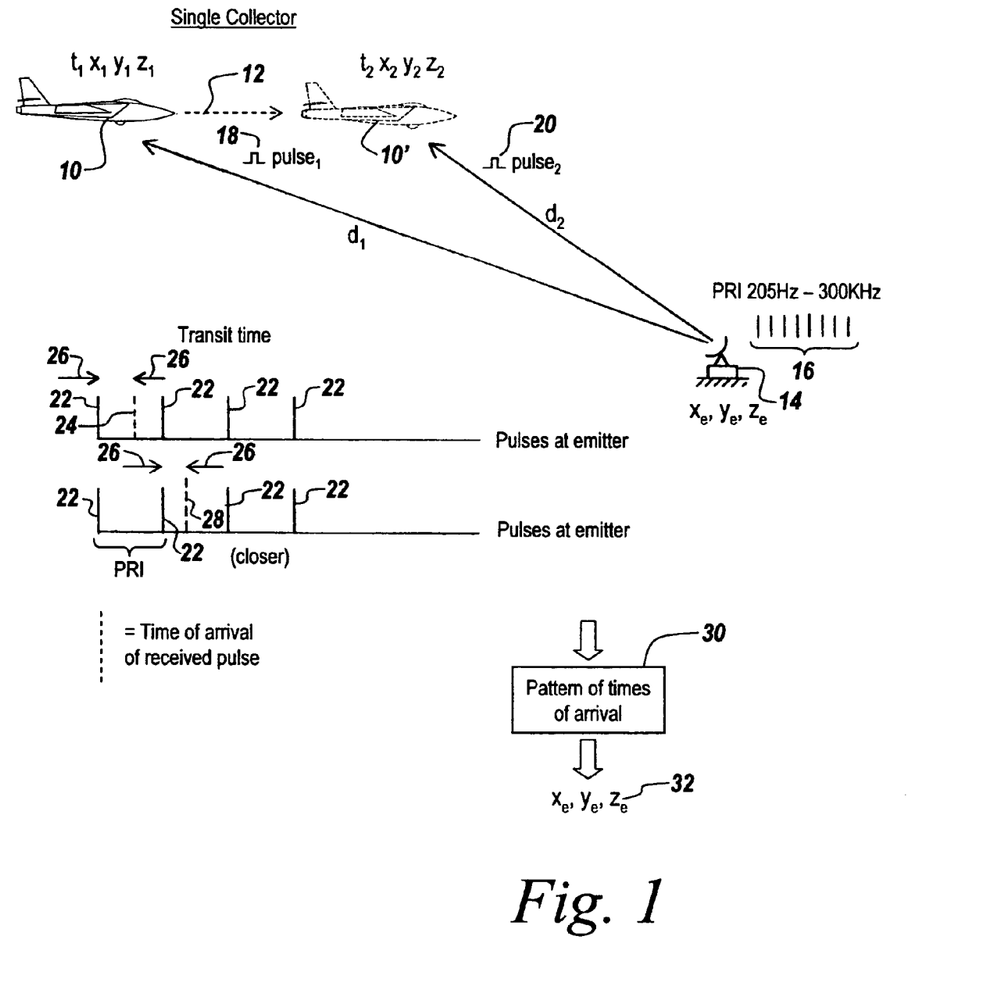
FIG. 1 is a diagrammatic illustration of a single collector system, shown collecting data at two points along the flight path of an aircraft, with the pattern of changes of inter-pulse intervals resulting in the geolocation of the pulse-emitting source.

Referring now to FIG. 1, in a single-collector embodiment of the subject invention, an aircraft 10 at a position $x_1$, $y_1$, $z_1$ at a time $t_1$ flies along a path 12 so that, as illustrated at 10', it occupies a position $x_2$, $y_2$, $z_2$ at a time $t_2$. It should be noted that the figure shows the arrival of two pulses at the collector. In practice, many more pulses must be collected such that the time to move from the initial location to the final location can be in excess of 30 seconds to establish an adequate baseline between the first pulse collected and the last pulse collected.

An emitter 14 produces a string or sequence of pulses 16 at a pulse repetition interval or PRI of between 205 Hz to 300 KHz for typical radars. It is noted that the aircraft when in position 10 is at a distance $d_1$ from emitter 14, whereas when the aircraft is at position 10' it is at a distance $d_2$ from the emitter. Note also that the aircraft at position 10 receives a pulse 18 designated $pulse_1$, whereas at time $t_2$ the collector at position 10' receives a pulse 20 designated $pulse_2$.

Key to this invention is that the notion of one aircraft moving over time to a second position to collect additional pulses is equivalent to having two aircraft instantaneously at the two positions collecting pulses. This is the basis of the multi-ship embodiment of the subject invention.

For the aircraft at position 10, in the graph below, the pulses at the emitter are illustrated at 22, whereas the first pulse in the sequence arrives at the collector at a time of arrival designated by dotted line 24. The time interval between the transmission and receipt of the first pulse is illustrated by double-ended arrows 26 and corresponds to the transit time.

As can be seen by dotted line 28, when the collector is closer to the emitter, received pulse 28 will arrive in a shorter amount of time than when the collector is a distance $d_1$ from the emitter. This means that as the collector moves closer to the emitter, the inter-pulse interval between received pulses will be shorter than the interval between those pulses at the transmitter.

As illustrated at 30, knowing a pattern of changes in the inter-pulse intervals, one can establish the geolocation of the emitter as illustrated at 32.

Here it will be seen that in the two-collector interpretation of FIG. 1, the collectors may or may not see the same pulses at their respective locations. As will be described, it is possible to ascertain which pulses in pulse train 16 pulse 18 and pulse 20 are; and for this reason it is possible to accumulate an ensemble of times of arrival from each of the multiple ships and combine them as if one ship had collected them. Associated therewith will be a pattern of changes in the inter-pulse intervals for which only one emitter position on the surface of the earth will exist.

The subject algorithm solves the location not by a direct solution of an equation but rather by postulating the position of the emitter and what set of time-of-arrival results is expected at the various positions of the platforms. One thereafter comes up with an error that is minimized by driving the hypothesis to another location.

In operation, assuming that each emitter is fixed at a particular location, one collector receives the first pulse with a certain time of arrival based on its distance from the emitter. The second pulse may then arrive at a collector that is at a difference distance from the emitter and there is a time interval between the first two pulses. This is called the inter-pulse interval. The inter-pulse interval is derived from time-of-arrival measurements. Typically, there is a certain fixed interval at which the emitter generates pulses, for instance every 250 microseconds. Since the pulses are detected in general by collectors at different positions, the times of arrival are either sooner or later than the would have been had they all been collected by a single stationary collector. If the platform measuring the second pulse is closer to the radar than the platform that measures the first pulse, the second pulse is going to come in a little bit sooner than the 250 microseconds between the pulses, i.e., the PRI of the radar. Thus, the system is going to see the second pulse at a time a little bit less than 250 microseconds from the first pulse. Then if a third platform that measures the third pulse is farther from the radar than either of the first two, the system will measure a longer than 250 microsecond interval between the second and third pulses. If the fourth pulse is measured by the first collector, yet another inter-pulse interval will be measured, and so on.

What one therefore obtains is a series of inter-pulse intervals that are changing. One can then generate a pattern of the changes in inter-pulse intervals. This is done by measuring times of arrival and by comparing this pattern to a pattern of times of arrival generated from a hypothesized point. When one compares the measured times of arrival with the expected times of arrival from the hypothesized position, one can develop a number representing error. One can use a gradient descent method to modify the hypothesized location of the emitter to drive the error to zero. When the error becomes sufficiently small, the associated hypothesized location will satisfy all of the times of arrival. This unique spot is identified as the actual emitter location. If the gradient descent algorithm does not converge, then a new point on the grid is selected as a launch point and the process is repeated. Once a solution is found, the process is repeated at the next grid point. If after all grid points have been examined, there are more than one solution, these are ambiguities and an ambiguity resolving routine is run. Ambiguities occur because of the large spacing of the collectors, and can occur even when there are no measurement errors at all.

In one embodiment, ambiguities are effectively eliminated by exploiting the velocity of the collectors, even though they hardly move at all during the 10 or 20 milliseconds of the data collect. The frequency of the pulses is Doppler-shifted due to the radial-component of the velocity vector of the collector with respect to the emitter. If the radial component of the aircraft's velocity vector is towards the emitter, the measured frequency is higher than it is at the radar, and if it is away from the emitter, the measured frequency is lower. Each ambiguous location is used to compute the Doppler shift for each measured pulse for each collector. The shift is then removed from each measured frequency. For the correct geolocation solution, all the pulse frequencies should then result in the same value, namely the frequency of transmission at the radar. It can be shown that the incorrect solutions will have a potpourri of resultant frequency values for the pulses and can be ignored.

In terms of accuracy, the longer the baseline over which the collectors are positioned, the greater the accuracy of the geolocation calculation, but the greater the possibility of ambiguities. By using the ambiguity resolver, one obtains a very accurate geolocation in a very short amount of time with no ambiguities. With a single ship system flying a straight-line path, one has to fly a fair distance, for instance, several miles, along the baseline to achieve greater accuracy.

Note that if the collector is an antenna on an aircraft, the exact position of the antenna defines the position at which the data is collected. The position of the antenna will vary depending on the orientation of the airplane so that one has to factor in the position of a GPS point on the airplane, roll, pitch and yaw information to be able to accurately calculate where the antenna actually is. To the extent that the positions of a collector are not instantly known, i.e., the so-called navigation messages for the collectors come at different times than the times of arrival of the pulses, one must interpolate the positions of the airplane to the time of arrival of each pulse.

The formula for obtaining the hypothesized time of arrival of a pulse is as follows:

$$TOA = T_0 + \Delta R/C + (n-1)PRI \qquad \text{Equation (1)}$$

Here $\Delta R$ contains the x, y, z emitter location information (unknown) and the location of the aircraft that measured the pulse at the time of arrival of that pulse (known). As can be seen, one needs to know the exact pulse-to-pulse interval (PRI) for the radar. It cannot be assumed, for instance, that the pulse repetition interval of the radar is constant. In point of fact, radar pulse repetition intervals are not always constant. For the subject system to work accurately it is therefore necessary that the pulse-to-pulse interval be quickly ascertainable. If not, the processor must run through all the possible PRIs until the error between the hypothesized and measured times of arrival is below the appropriate threshold. It can be shown that there is a quantity Q associated with every radar that provides an estimate of the instantaneous true PRI of that radar.

It is also important to be able to know in a string or sequence of pulses which pulse a particular collector is detecting. While it may be impossible to know which is the first pulse from a radar, one can ascertain which pulse is first to arrive at one of a number of collector positions. Then assuming that this is the first pulse, one needs to be able to ascertain what the number of each subsequent pulse is—fifth, seventh, $25^{th}$, et cetera. It can be shown that it is possible to be able to ascertain what the pulse number is as an integer N related to Q, which represents the pulse number.

Given the fact that one can ascertain the pulse repetition interval or a quantity equivalent thereto, one can, through the above-mentioned iterative technique, drive the algorithm so as to minimize the error between the computed and measured TOAs, thus to be able to specify the emitter location when the error is below a predetermined threshold.

In the iterative solution to the geolocation problem, an emitter position is first postulated and the actual time-of-arrival measurements are matched with the expected time of arrivals given the postulated position. If one knows that a collector is at a given location and if one postulates the position of the emitter, one can calculate exactly what the times of arrival of the pulses are supposed to be. The question then becomes as to how well the observed set of times of arrival agrees with those that are generated as a result of the postulated position. An error is computed between the times of arrival from the hypothesized position and the actual measured pulses, with a Newton-Raphson algorithm utilized to correct the hypothesized position to minimize the error.

It can be shown that in Equation 1 there are 5 unknowns. $T_0$ (the time the first pulse is transmitted from the emitter) is unknown, the x, y, z coordinates of the emitter are unknown, and the PRI is unknown. Another parameter that equates to the true PRI, namely Q, is unknown and there is an integer N that identifies what pulse is arriving at a collector. One can know N and can choose a trial value of Q. This value of Q can be refined in the iterative procedure.

Q is selected in an averaging process to correspond to a calculated pulse repetition interval for the pulse train emitted by emitter 14. As noted hereinabove, radar pulse emitters either vary their PRIs or have a jitter or instability in their pulse trains, so that the pulse repetition intervals varying over a period of time.

Figure 2:
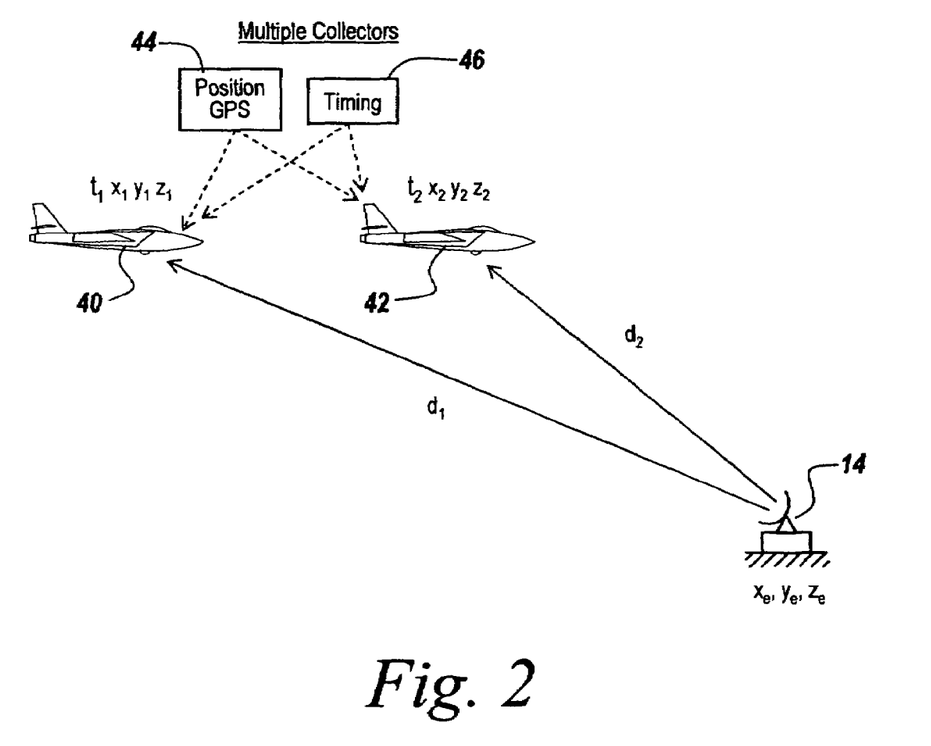
FIG. 2 is a diagrammatic illustration of a two-ship embodiment of the subject invention, illustrating that the collection of data on a single moving platform can be achieved by two platforms at separate locations over such a short time that the platforms have not moved any appreciable distance.

Referring to FIG. 2, two collectors 40 and 42 are shown at two positions, $x_1$ $y_1$ $z_1$ and $x_2$ $y_2$ $z_2$, respectively. The first receives a pulse at $t_1$ and the second at $t_2$ from emitter 14. Each collector uses GPS 44 to compute its position and synchronize its clock 46 so that the system may be considered as if one platform collected both pulses after moving from one position to the other.

Figure 3:
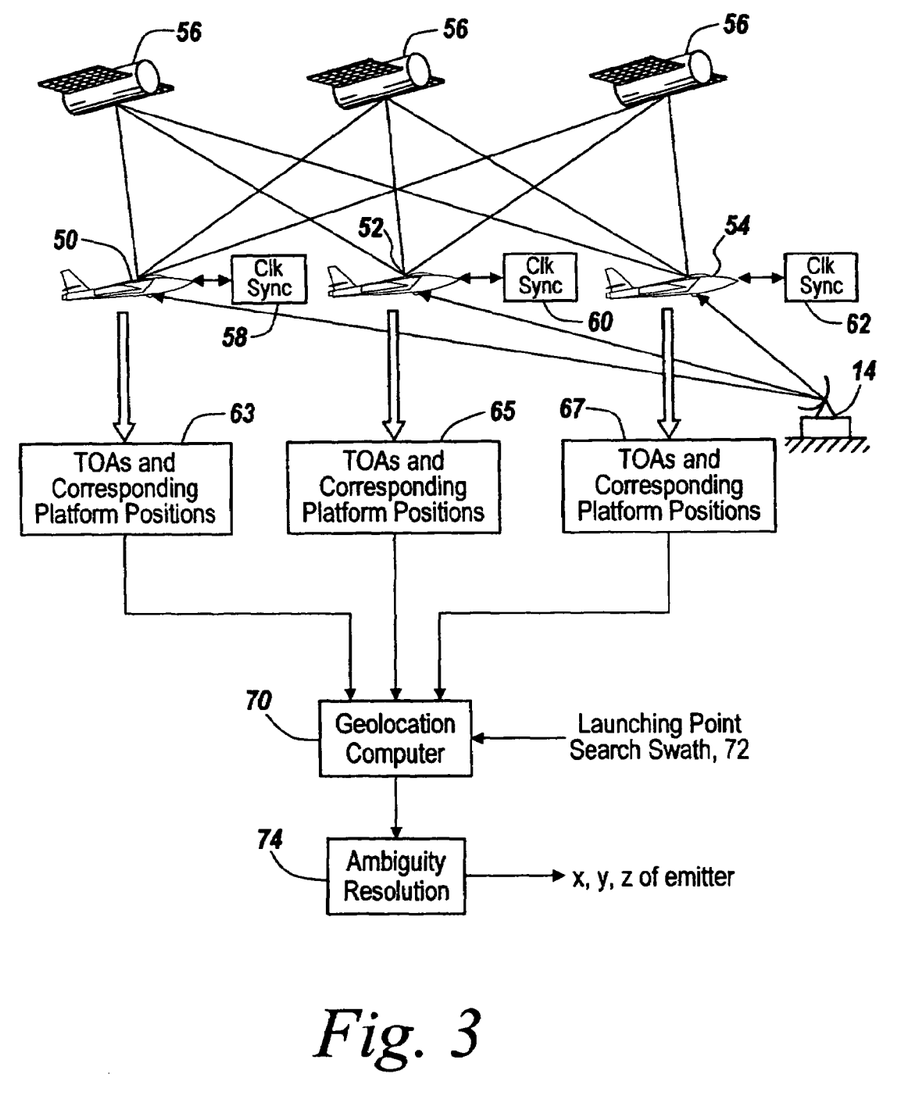
FIG. 3 is a diagrammatic illustration of an embodiment of the multi-ship collection system of the subject invention in which each ship receives inputs from GPS satellites that it uses to locate itself and to synchronize its onboard clock with the other ships, each ship measuring the time-of-arrival of pulses from a radar and outputting those times and its location at the time it measured each pulse to a geolocation computer for the computation of the location of the radar.

Referring to FIG. 3, GPS satellites 56 provide platforms 50, 52 and 54 with location and precise time information in terms of clocks 58, 60 and 62, respectively. The pulses measured at each platform from emitter 14 are sent with the associated platform location to a geolocation computer 70 that performs the geolocation computation. All TOAs are combined in time order and a set of integers is found for the ensemble, together with the parameter Q. A search swath 72 is used to generate coarse hypothesized locations of the emitter. Using the hypothesized location of the emitter, the position of each platform when it receives each pulse and the integer N of each pulse and Q value, the hypothesized time-of-arrival is computed according to Equation 1. The reference time is the time-of-arrival of the first pulse. The set of hypothesized times-of-arrival is compared with the set of measured TOAs to find the geolocation. All valid results are input to an ambiguity resolver 74, which selects the correct geolocation of the emitter.

Figure 4:
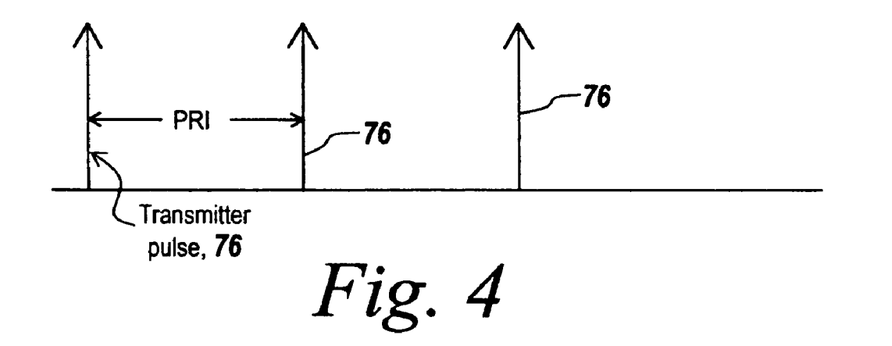
FIG. 4 is a diagrammatic illustration of the pulse repetition interval between adjacent pulses in a pulse string or sequence generated at the pulsed transmitter.

Referring now to FIG. 4, as mentioned hereinabove the pulse repetition interval of the emitter is critical to the accuracy of the geolocation process. The pulse repetition interval is defined as the interval between transmitter pulses, here show at 76.

Figure 5:
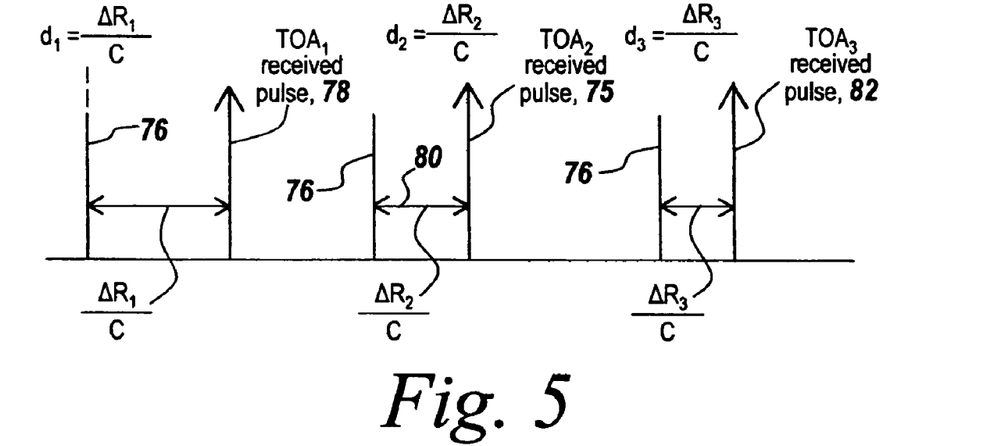
FIG. 5 is a diagrammatic illustration of the measured time of arrival of received pulses for three different collector standoff distances, showing different transit times between the transmitted and received pulses.

Referring to FIG. 5, if one can accurately establish the pulse repetition interval at the emitter, then the time difference between a transmitted pulse 76 and a received pulse 78 establishes the distance $\Delta R_1/C$ between the emitter and the particular collector. An can be seen, for a distance $d_2$ which is closer than $d_1$, $\Delta R_2/C$ as illustrated at 80 is closer in time to transmitted pulse 76 than is received pulse 78 to its corresponding transmitted pulse 76.

Likewise, for a collector antenna at a distance $d_3$ from the emitter, the received pulse 82 at $d_3$ is received at some time later than the time of the emitted pulse 76. The result is that one can establish $\Delta R_1/C$, $\Delta R_2/C$, $\Delta R_3/C$, etc. by measuring the times of arrival of pulses at multiple distinct distances from the emitter and comparing with hypothesized arrival times, as described hereinabove.

Figure 6:
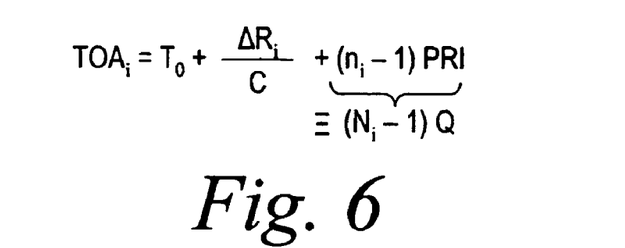
FIG. 6 is a formula that is used in geolocating a pulsed emitter.

How the position of the emitter is obtained can be seen by considering the equation of FIG. 6 in which the time of arrival of an ith pulse is computed as a time $T_0+\Delta R_i/C+(n_i-1)$ PRI. $\Delta R_i$ is the difference between one of the collectors' positions (known) and the emitter's position (unknown). $n_i$ (the number of the ith pulse from the first one received in the collect) and the PRI are calculatable. Thus the equation contains five unknowns: $T_0$, x, y and z of the emitter, and the PRI. The PRI is treated as unknown even though an initial guess is provided as a result of determining $n_i$. At least five equations (corresponding to five pulses) would be needed to solve for the five unknowns. Since the measurements contain errors, the equations cannot be solved exactly, and the error minimization technique described above is employed to solve for the unknowns. The initial guess for the PRI was mentioned, the initial guess for the emitter position was described above, and the initial guess for $T_0$ is simply the time of arrival of the first pulse. The Newton-Raphson gradient descent algorithm applied to the differences between the TOAs computed by the equation in FIG. 6 and the measured TOAs nudges the values of all five unknowns until a minimum value is found.

Figure 7:
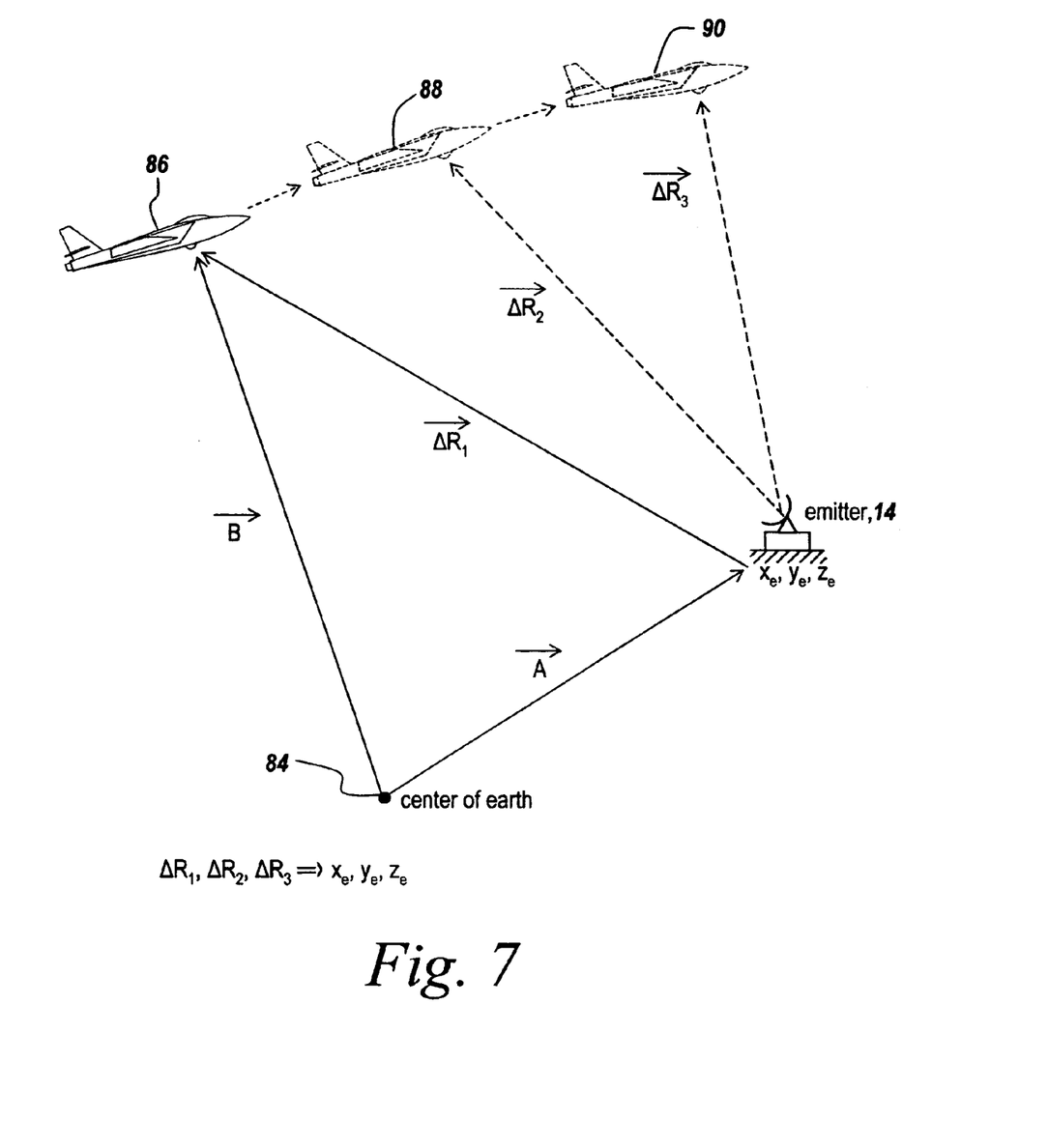
FIG. 7 is a diagrammatic illustration of the geolocation of an emitter in terms of geometry involving vectors $\Delta R_1$, $\Delta R_2$ and $\Delta R_3$, with the vectors referenced to a point at the center of the earth.

Referring to FIG. 7, the geometry involved is shown by referencing all vectors to a common reference, namely the center of the earth as illustrated at 84. Note that collectors on three aircraft 86, 88 and 90 are at different distances from emitter 14. This is described by vectors $\Delta R_1$, $\Delta R_2$ and $\Delta R_3$. Knowing $\Delta R_1$, $\Delta R_2$, $\Delta R_3$, etc., one can derive the emitter position $x_e$, $y_e$, $z_e$.

Figure 8:
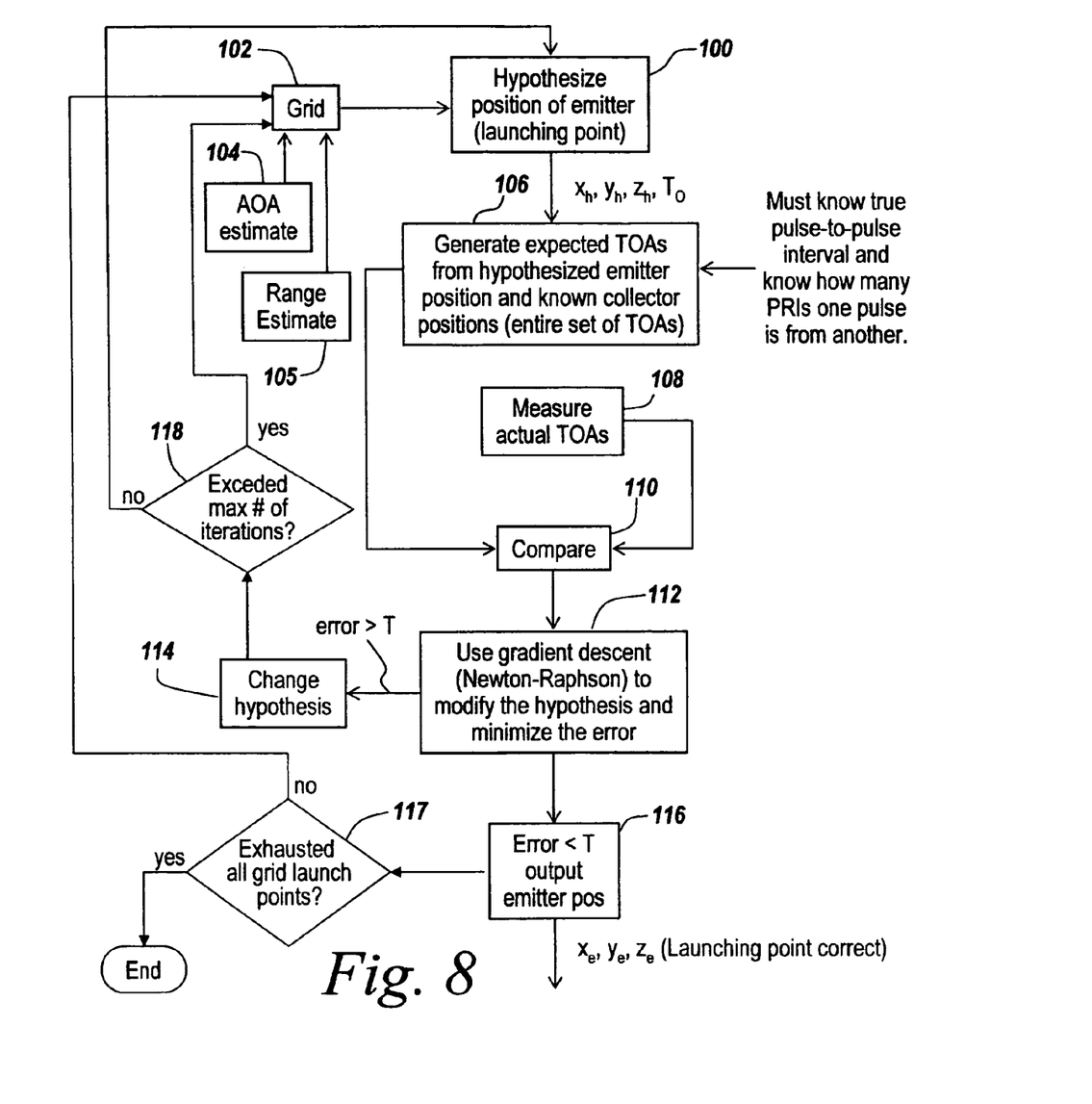
FIG. 8 is a flow chart illustrating the subject processing method for geolocating a pulsed emitter that utilizes a hypothesized position of the emitter as a starting or launching point, the generating of expected times of arrival of pulses based on the hypothesized emitter position given known collector positions, the measurement of actual times of arrival of pulses at the collectors, the comparison of the measured with the hypothesized times of arrival and the use of a gradient descent method to modify the hypothesis to minimize the error between the expected times of arrival and the measured times of arrival; and, FIG. 9 is a diagrammatic illustration of a grid swath generated from rough emitter position data, in which a launching point is located within the grid, with the launching point being modified in accordance with a gradient descent method to change the launching point to one which minimizes the error.

Referring now to FIG. 8, in one embodiment of the subject invention one first hypothesizes the position of an emitter as illustrated at 100. This is called the launching point. The hypothesized position of the emitter is established from a grid 102; which is in turn derived from an angle-of-arrival estimate 104 and a coarse range estimate 105.

The hypothesized position of the emitter is utilized at 106 to generate expected times of arrival of pulses from the hypothesized emitter position given known collector positions. The result is that for a given launching point, unit 106 generates an entire set of hypothesized times of arrival.

As illustrated in 108, one measures actual times of arrival at the various collector positions and at 110 compares the expected times of arrival with the actual times of arrival. The difference is an error which can be reduced as illustrated at 112 utilizing a gradient descent method, the common Newton-Raphson method, to modify the hypothesized position of the emitter to minimize the error between the expected times of arrival and the measured times of arrival. One utilizes the Newton-Raphson technique to change the hypothesis as illustrated at 114 so as to change the launching point to one which will result in expected times of arrival more closely approximating the measured times of arrival.

The process is iterative, with the launching points being moved in a direction that minimizes error, up to a maximum number of iterations. When the error in any iteration is less than a predetermined threshold as illustrated at 116, the output is the emitter position, which is the position indicated by the last point selected by the Newton-Raphson algorithm that resulted in the error going below the predetermined threshold. In one embodiment, if the algorithm fails to find a point in a grid box that drives the error below a threshold value or fails to find a stable error in a grid box before exceeding a predetermined maximum number of Newton-Raphson iterations for the grid box as determined by decision box 118, no geolocation answer is output and a different launch point in a different grid box is selected.

In one embodiment, because of possible ambiguities, the above process is repeated until all points in all of the grid boxes have been used as launch points, as determined by decision box 117. Having this entire array of launch points, the system analyzes the results and selects the unambiguous solution amongst the results from all of these launch points, i.e., all of the launch points in all of the grid boxes.

The above process runs through all the grid launch points because in the multi-ship case, in some instances where the collectors are 50–100 miles apart, there may be ambiguities. That is, multiple grid launch points may yield different geolocation solutions that are all viable. Special ambiguity processing, shown in 74 of FIG. 3 and described above, is then invoked to select a single location as the final geolocation solution.

Figure 9:
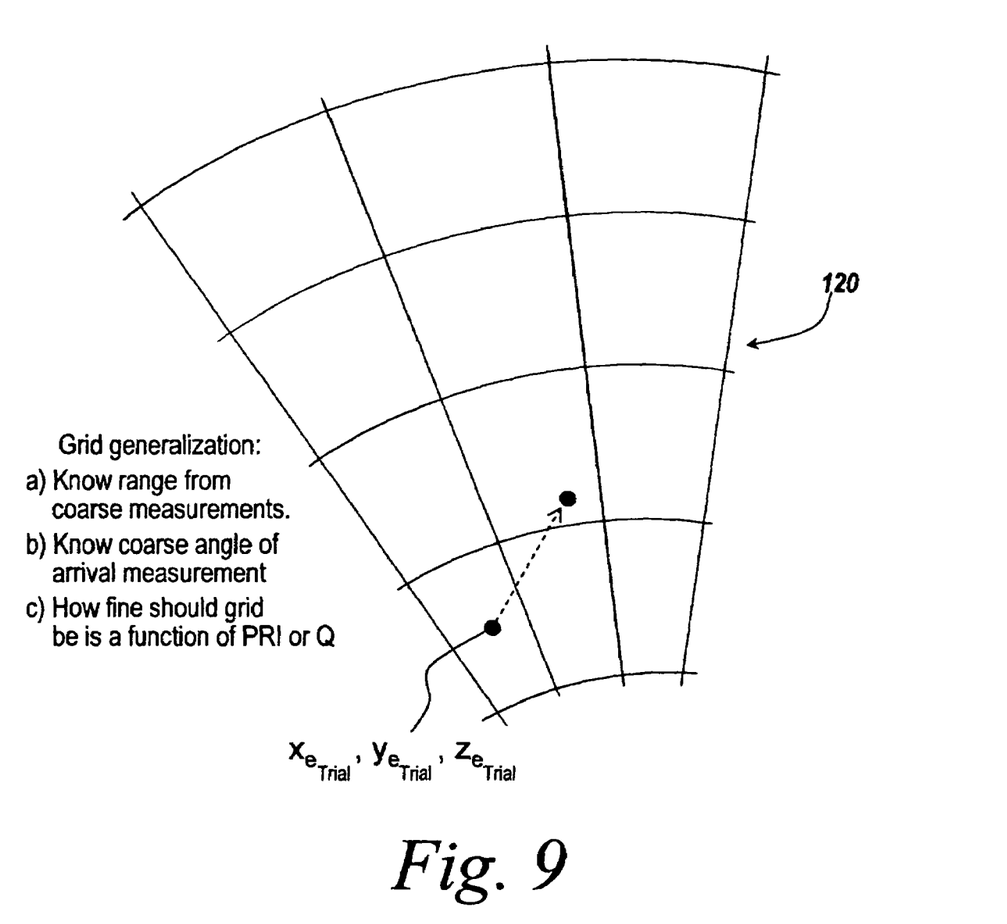

Referring to FIG. 9, in order to set a launching point, one generates a swath 120 of grid boxes that is based on coarse range measurements and coarse angles of arrival measurements. How fine the grid is to be is a function of the expected pulse repetition interval or, as mentioned before, Q. Using the above-mentioned gradient descent method the launching point is moved in a grid box, and the error is assessed. When the error is below a predetermined threshold, the location of the emitter is known. The above techniques of FIG. 8 are used to allow the Newton-Raphson algorithm to converge by properly selecting launching points that are close enough to the emitter location.

With the multi-ship system, the collectors do not have to move at all because one achieves differences in distance simply by the fact that the collectors are in different positions. Thus, the subject invention may be applied to situations where the collectors are stationary. This is the case where ground troops pre-position spaced-apart collectors at known locations. As a result, one need not use aircraft to locate enemy radars, but rather ground-based units can be deployed. In the stationary multi-collector case, the ambiguity resolver 74 in FIG. 3 simply examines the error in the cost function (the sum of the differences between the hypothetical and measured TOAs) for each candidate solution and chooses the one with the smallest error as the location of the radar.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for improving the accuracy of a coherent time-of-arrival geolocation system in ascertaining the location of a pulse train emitter, comprising the steps of:
providing multiple spaced-apart collectors at known locations so as to establish a long measurement baseline;
at each collector, measuring times of arrival of pulses emitted by the pulse train emitter using non-snippet based coherent time-of-arrival processing over tens of seconds to correlate received pulses at different collectors with associated emitted pulses such that only one received pulse need be correlated with the corresponding emitted pulse to obtain geolocation information based on time of arrival of other pulses at other collectors, thereby to remove any requirement of simultaneous collection of the same pulse at multiple collection platforms; and,
from an ensemble of measured times of arrival deriving the location of the emitter.

2. The method of claim 1, and further including the steps of:
locating the collectors aboard separate aircraft;
flying the aircraft along widely spaced-apart flight paths;
determining the location of the collectors along respective flight paths;
establishing a common time reference for all aircraft; and,
wherein the location-deriving step includes using coherently measured times of arrival of the pulses at the aircraft collectors, whereby the collectors are instantaneously at different locations relative to the emitter, such that the time to derive a geolocation is minimized.

3. The method of claim 1, wherein the measuring step includes measuring the times of arrival of pulses from the emitter at all collectors synchronously, thus to minimize processing to achieve a geolocation of the emitter.

4. The method of claim 3, wherein the measurements of times of arrival occur over a dwell and wherein all collectors need not collect pulses over the same dwell.

5. The method of claim 4, wherein the dwell is between 10 and 20 milliseconds and wherein the step of deriving the location of the emitter is in the millisecond range due to the collection of time-of-arrival data at the multiple collectors.

6. The method of claim 3, wherein the measuring of the times of arrival of pulses from the emitter at the spaced-apart collectors includes effectively using the same clock so as to establish a synchronous measurement at the widely spaced-apart collector locations.

7. The method of claim 1, wherein the driving step includes postulating a launching point corresponding to a rough estimate of the location of the pulse train emitter; calculating from the launching point expected times of arrival at the known location of the collectors; comparing the measured times of arrival of pulses at a collector with expected times of arrival to generate an error; in an iterative process, changing the launching point to minimize the error; and, declaring the launching point to be the location of the emitter when the error is below a predetermined threshold.

8. The method of claim 7, wherein the postulating step includes forming a grid swath having grid boxes and locating an initial launching point in a grid box.

9. The method of claim 7, wherein a point is declared the location of the emitter only if all of the launching points in the iterative process have been analyzed.

10. The method of claim 9, wherein the analysis of the launching points includes establishing which of the launching points results in the least error, thus to minimize positional ambiguity for the emitter and selecting from the analysis the launching point having the least error.

11. The method of claim 9, wherein the analysis of the launching points includes computing the undoppler-shifted frequency of each of the measured pulses and declaring a launching point as establishing the location of the emitter only for launching points associated with measured pulses which have a frequency matching that of the emitter.

12. The method of claim 8, wherein for launching points within a grid box there is a maximum allowed number of iterations for establishing from the launching points in the grid box an error below a predetermined error, and further including the step of locating a launching point in a different grid box if the maximum number of iterations for the grid box has been exceeded, rather than selecting a new launch point in the original grid box.

13. A system for improving the accuracy of a coherent time-of-arrival geolocation system in ascertaining the location of a pulse train emitter, comprising:
multiple spaced-apart collectors at known locations so as to establish a long measurement baseline;
a receiver at each of said collectors for measuring times of arrival of pulses emitted by the pulse train emitter using coherent time-of-arrival processing; and,
a processor using coherent processing in which the same emitted pulse need not be simultaneously received at said spaced-apart collectors for deriving the location of the emitter from an ensemble of measured times of arrival.

14. The system of claim 13, wherein said collectors are located aboard separate aircraft, said aircraft flying along widely spaced-apart flight paths, and further including a position-determining unit for determining the location of the collectors along respective flight paths; and, a common time reference for all aircraft, said processor including an algorithm for coherently measuring times of arrival of the pulses at the aircraft collectors, whereby the collectors are instantaneously at different locations relative to the emitter, such that the time to derive a geolocation is minimized.

15. The system of claim 13, wherein the times of arrival of pulses from the emitter are measured at all collectors synchronously, thus to minimize processing to achieve a geolocation of the emitter.

16. The system of claim 15, wherein the measurements of times of arrival occur over a dwell and wherein all collectors need not collect pulses over the same dwell.

17. The system of claim 16, wherein the dwell is between 10 and 20 milliseconds and wherein deriving the location of the emitter is in the millisecond range due to the collection of time-of-arrival data at the multiple collectors.

18. The system of claim 15, wherein the measuring of the times of arrival of pulses from the emitter at the spaced-apart collectors includes a synchronized clock at all collectors so as to establish a synchronous measurement at the widely spaced-apart collector locations.

19. The system of claim 13, wherein the processor includes an algorithm for postulating a launching point corresponding to a rough estimate of the location of the pulse train emitter, for calculating from the launching point expected times of arrival at the known locations of the collectors, for comparing the measured times of arrival of pulses at a collector with expected times of arrival to generate an error, for changing the launching point to minimize the error in an iterative process and for declaring the launching point to be the location of the emitter when the error is below a predetermined threshold.

20. The system of claim 19, wherein a point is declared the location of the emitter only if all of the launching points in the iterative process have been analyzed.

21. The system of claim 20, wherein the analysis of the launching points includes an algorithm establishing which of the launching points results in the least error, thus to minimize positional ambiguity for the emitter, said algorithm selecting from the analysis the launching point having the least error.

22. The system of claim 20, wherein the analysis of the launching points includes an algorithm for measuring the undoppler-shifted frequency of each of the measured pulses and declaring a launching point as establishing the location of the emitter only for launching points associated with measured pulses that have a frequency matching that of the emitter.

23. The system of claim 19, wherein the algorithm for postulating a launching point includes a process for forming a grid swath having grid boxes and wherein the processor algorithm includes a subroutine for launching points within a grid box, for establishing a maximum allowed number of iterations for establishing from the launching points in the grid box an error below a predetermined error, and for locating a launching point in a different grid box if the maximum number of iterations for the grid box has been exceeded, rather than selecting a new launch point in the original grid box.

* * * * *